(12) United States Patent
Xu et al.

(10) Patent No.: US 8,006,643 B2
(45) Date of Patent: Aug. 30, 2011

(54) ROBOTIC PET-SITTER SYSTEM

(75) Inventors: Yangsheng Xu, Guangdong (CN); Huihuan Qian, Hong Kong (CN); Hang Tong, Hong Kong (CN); Bufu Huang, Hong Kong (CN); Xi Shi, Hong Kong (CN)

(73) Assignee: Shenzhen Institute of Advanced Technology, Guangdong (CN)

( * ) Notice: Subject to any disclaimer, the term of this patent is extended or adjusted under 35 U.S.C. 154(b) by 160 days.

(21) Appl. No.: 12/234,253

(22) Filed: Sep. 19, 2008

(65) Prior Publication Data

US 2010/0139569 A1 Jun. 10, 2010

(30) Foreign Application Priority Data

Sep. 26, 2007 (CN) .......................... 2007 1 0077355

(51) Int. Cl.
*A01K 1/00* (2006.01)
(52) U.S. Cl. ................................... 119/57.92
(58) Field of Classification Search ............... 119/51.01, 119/51.02, 57.92, 702, 707, 711; 446/456, 446/475; 473/577; 340/573.1, 573.3
See application file for complete search history.

(56) References Cited

U.S. PATENT DOCUMENTS

| | | | | |
|---|---|---|---|---|
| 5,669,328 A | * | 9/1997 | Lanfranchi | 119/57.92 |
| 6,514,117 B1 | * | 2/2003 | Hampton et al. | 446/301 |
| 6,651,592 B2 | * | 11/2003 | Maddox et al. | 119/720 |
| 6,748,898 B2 | * | 6/2004 | Ulman et al. | 119/57.92 |
| 6,904,868 B2 | * | 6/2005 | Block et al. | 119/51.12 |
| 7,671,749 B2 | * | 3/2010 | Alvarado | 340/573.2 |
| 2001/0028308 A1 | * | 10/2001 | De La Huerga | 340/573.1 |
| 2008/0105205 A1 | * | 5/2008 | Goehring | 119/51.02 |

\* cited by examiner

*Primary Examiner* — Kimberly S Smith
*Assistant Examiner* — Monica Williams
(74) *Attorney, Agent, or Firm* — Jackson IPG PLLC; Demian K. Jackson

(57) ABSTRACT

A robotic pet-sitter system comprises a control system and a robotic body, the control system used to wireless launch control instruction signals; a wireless receiver module is defined in the robotic body, used to receive control instruction signals and to process the control instruction signals into control signals, the robotic body further comprises a driving system and a feeding module, the driving system used to drive the robotic body moving according to the control signals, the feeding module used to open the feeding box placed with pet food according to the control signals. The local PC communicates with a remote PC through Internet, and the remote PC long-distance controls the robotic body and monitors pet through Internet. The robotic pet-sitter system of the present invention can care for and monitor the pet when the owner is not at home.

17 Claims, 5 Drawing Sheets

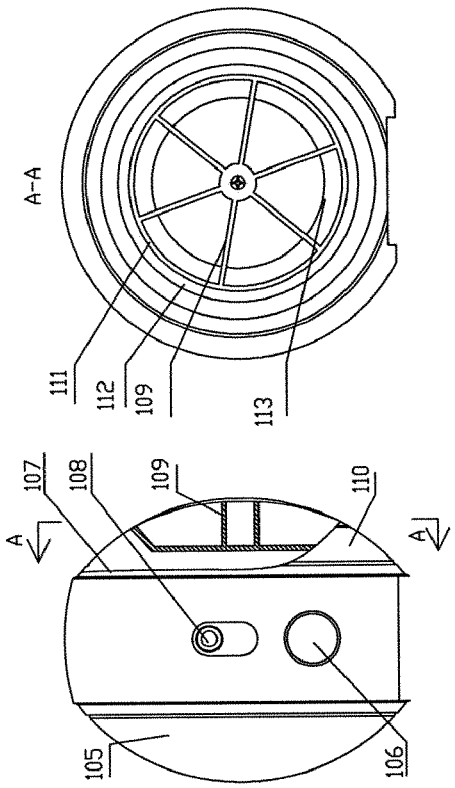
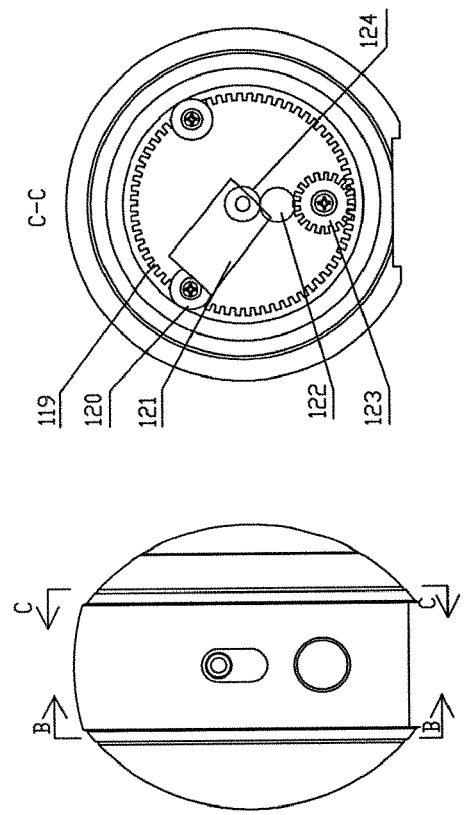
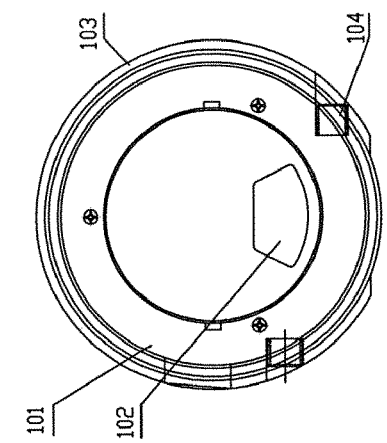
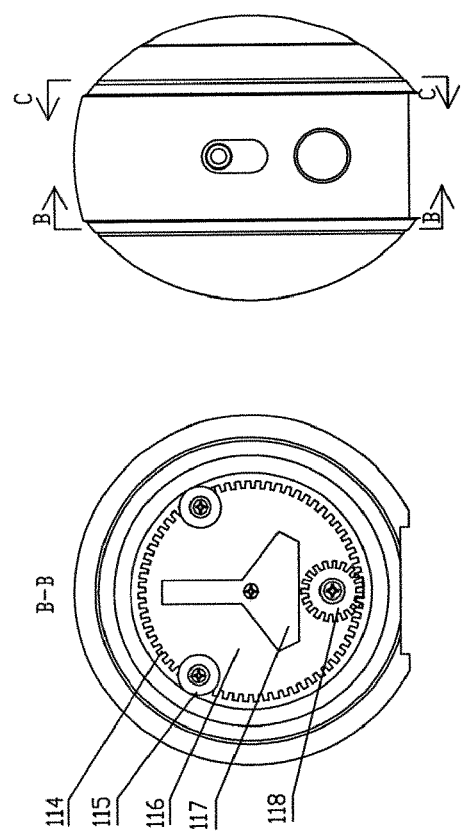

ROBOTIC PET-SITTER SYSTEM

BACKGROUND OF THE INVENTION

1. Field of the Invention

The present invention relates to an automatic system, intelligent robot and communication technology field, particularly relates to an intelligent Service-oriented robotic system used to care for family pets.

2. Description of the Prior Art

The development of robotic technology is an important symbol and embodiment of the national high-tech level and the industrial automation degree. As the rapid technical development of sensor, control, computer, drive, materials and other involved area, research and design of the robot stride forward the third generation—Intelligent Robot. An Intelligent Robot is equipped with various sensors, can integrate information obtained from various sensors, can effectively adapt to the changing environments, and has strong self-adaptation, study and self-control abilities.

The intelligent robotic technology relates to many subjects and technologies, such as Computer Science and Technology (Image Processing, Pattern Recognition, Machine Vision, Artificial Intelligence, etc.), Automation Science and Technology (Motion Control, Control of Complex Systems, Sensor Technology, etc.), Mechanical Electronic Technology etc. It integrates the development achievements of many subjects, and also pushes the development of those subjects, it represents the development frontier of high-tech, and is the hot focus direction of the scientific and technological research.

For a long time, Japan is the largest industrial robot manufacturer in the world, its output is twice the sum of all the other countries in the world. Now, Japan's business such as NEC, Sony, Toyota, Honda and other companies have invested hundreds of millions of dollars in the development of the family robots each year to maintain its leading position in the world. Family robots will produce huge benefits to society, and will also bring great wealth to the manufacturers. The robots which are researched, developed and produced by some Japanese companies, have already been taken from the previous workshop, office to enter ordinary families.

The family pets can not be cared for when their owners go for travel or evection, therefore, proposed the design concept of the present invention.

SUMMARY OF THE INVENTION

An object of the present invention is to provide a pet-sitter intelligent robotic system, the robotic system combines network communications, and can replace the owners who frequent travel or on evection of taking care of their beloved pets, feed the pets, and game together with them.

To achieve the above objects, a robotic pet-sitter system, comprises a control system and a robotic body, the control system used to wirelessly launch control instruction signals; a wireless receiver module is defined in the robotic body, and used to receive control instruction signals and process the control instruction signals into control signals. The robotic body also comprises a driving system and a feeding module, the driving system used to drive the robotic body moving according to action instructions of the control signals, the feeding module used to open the feeding box placed with pet food according to feeding instructions of the control signals.

The robotic pet-sitter system, wherein the control system comprises a control module used to send out control instructions, a signal processing and transmission module. The signal processing and transmission module is used to enlarge and modulate the control instructions sent out by the control module, and wirelessly launch control instruction signals after modulation; the wireless receiver module comprises a wireless communication module, a main control module, and a motor control module. The main control module connecting with the wireless communication module, is used to decode the control instruction signals received by the wireless communication module into the control signals, the motor control module is used to amplify the control signals and control the driving system and feeding module.

The robotic pet-sitter system, wherein the robotic body also comprises a camera, the camera connecting with the wireless communication module, is used to process the obtained image into video signals, and launch out through the wireless communication module; the control system also comprises a wireless camera receiver module to receive the video signals, an A/D image converter connecting with the wireless camera receiver module, and an image processing display device connecting with the control module. The A/D image converter is used to A/D convert the received video signals, then the converted digital video signals are processed and displayed by the image processing display device.

The robotic pet-sitter system, wherein the robotic body also comprises a camera-driving motor, the camera-driving motor connecting with the motor control module, used to adjust the camera's pitching angle according to camera-driven instructions of the control signals.

The robotic pet-sitter system, wherein the control system also comprises an audio processing module and an audio transmission module connecting with the control module, and the robotic body also comprises a wireless audio receiver and a speaker for audio signals transmission and broadcasting.

The robotic pet-sitter system, wherein the control module, the image processing display device and the audio processing module are realized by using the local PC.

The robotic pet-sitter system, wherein the local PC communicates with a remote PC through Internet, and the remote PC remotely controls the robotic body and monitors pet through Internet.

The robotic pet-sitter system, wherein the robotic body is a spherical structure body, tracks being defined in its both sides, the driving system and the feeding module being installed in the spherical structure body.

The robotic pet-sitter system, wherein the driving system comprises at least a driving motor and a motion gear, the motion gear being defined inside the track, driving the motion gear by the driving motor defined in the spherical structure body.

The robotic pet-sitter system, wherein the feeding module comprises a feeding motor and the feeding box, the feeding motor is connected with the motor control module, and is used to drive the switch of the feeding box; the feeding box is defined under the cover plate fixed in the side of a spherical structure body, being several feeding lattices for placing with pet food, a feeding mouth being defined in the bottom of the cover plate, and the feeding motor driving the feeding box rotating, used to select the feeding lattices corresponding to the feeding mouth.

The robotic pet-sitter system, wherein a counterweight being defined in the spherical structure body, the counterweight is fixed in connection with the spherical structure body, used to maintain the vertical position of the spherical structure body on the track.

The robotic pet-sitter system, wherein the signal processing and transmission module comprises a radio module, a modulation circuit connecting with the control system, the modulation circuit used to amplify and modulate the control instructions, the wireless transmission module used to launch control instruction signals after modulation.

The beneficial effects of the present invention: With the family pet-sitter intelligent robot, when owners are not at home, their pets will no longer be lonely, and will also no longer be hungry. While the owners are far away from their pet, they can still observe the situation of their pet, play games with the pets, and feed the pets. As the family pet-sitter intelligent robot has the monitoring function, the owners can also know what happened at home.

BRIEF DESCRIPTION OF THE DRAWINGS

FIG. 5a is a front view of a robotic pet-sitter system of the present invention;

FIG. 5b is a side view of a robotic pet-sitter system of the present invention;

FIG. 5c is a sectional view of FIG. 5b along the line A-A of a robotic pet-sitter system of the present invention;

FIG. 6a is a side view of a robotic pet-sitter system of the present invention;

FIG. 6b is a sectional view of FIG. 6a along the line B-B of a robotic pet-sitter system of the present invention;

FIG. 6c is a sectional view of FIG. 6a along the line C-C of a robotic pet-sitter system of the present invention.

DESCRIPTION OF THE PREFERRED EMBODIMENT

The present invention is best understood from the following detailed description with reference to the accompanying figures and embodiments.

Figure 1:
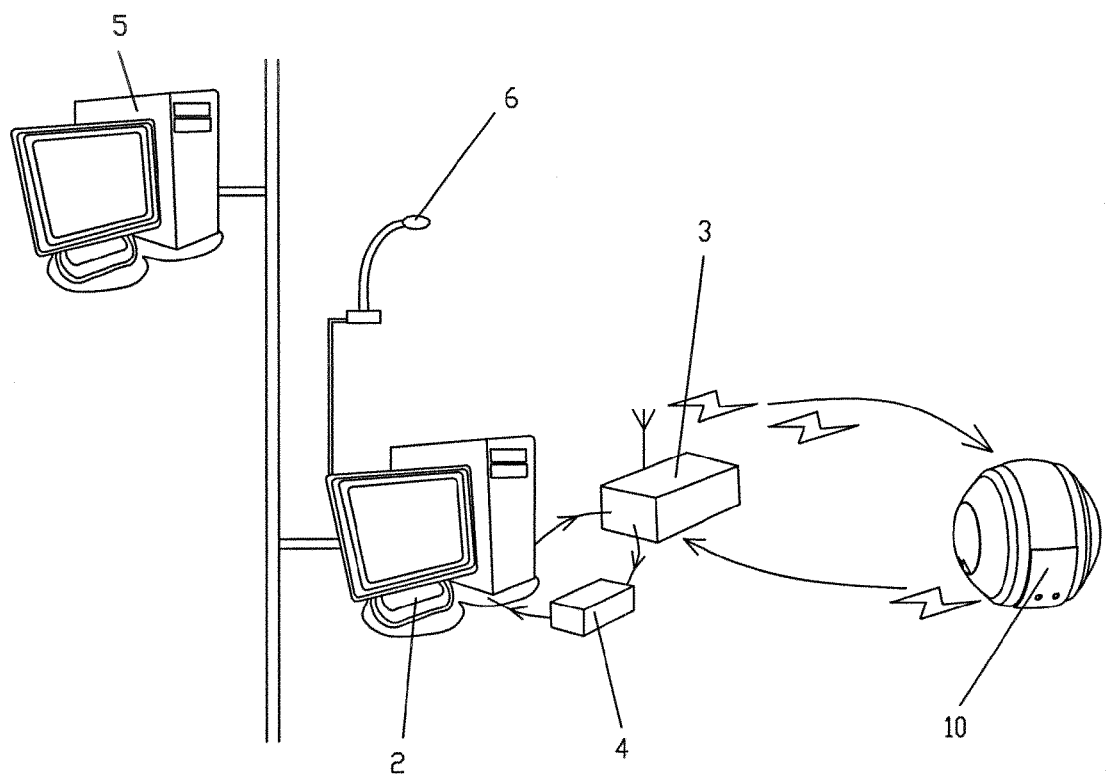
FIG. 1 is a perspective view of a robotic pet-sitter system of the present invention.

As shown in FIG. 1, The robotic pet-sitter system of the present invention includes two parts: a robotic body 10 and a control system, the control system can be achieved by a local PC 2 with a radio frequency modules 3 and a video capture box 4. The local PC 2 communicates with a remote PC 5 through the Internet, exchanging audio and video data and transmitting control signals. Pet owners can send out control instructions in remote PC 5, control the robotic body 10 moving and playing games with the pet, or feeding and playing music to the pet through the Internet, and the situation of the pet can be observed via the Internet.

Figure 2:
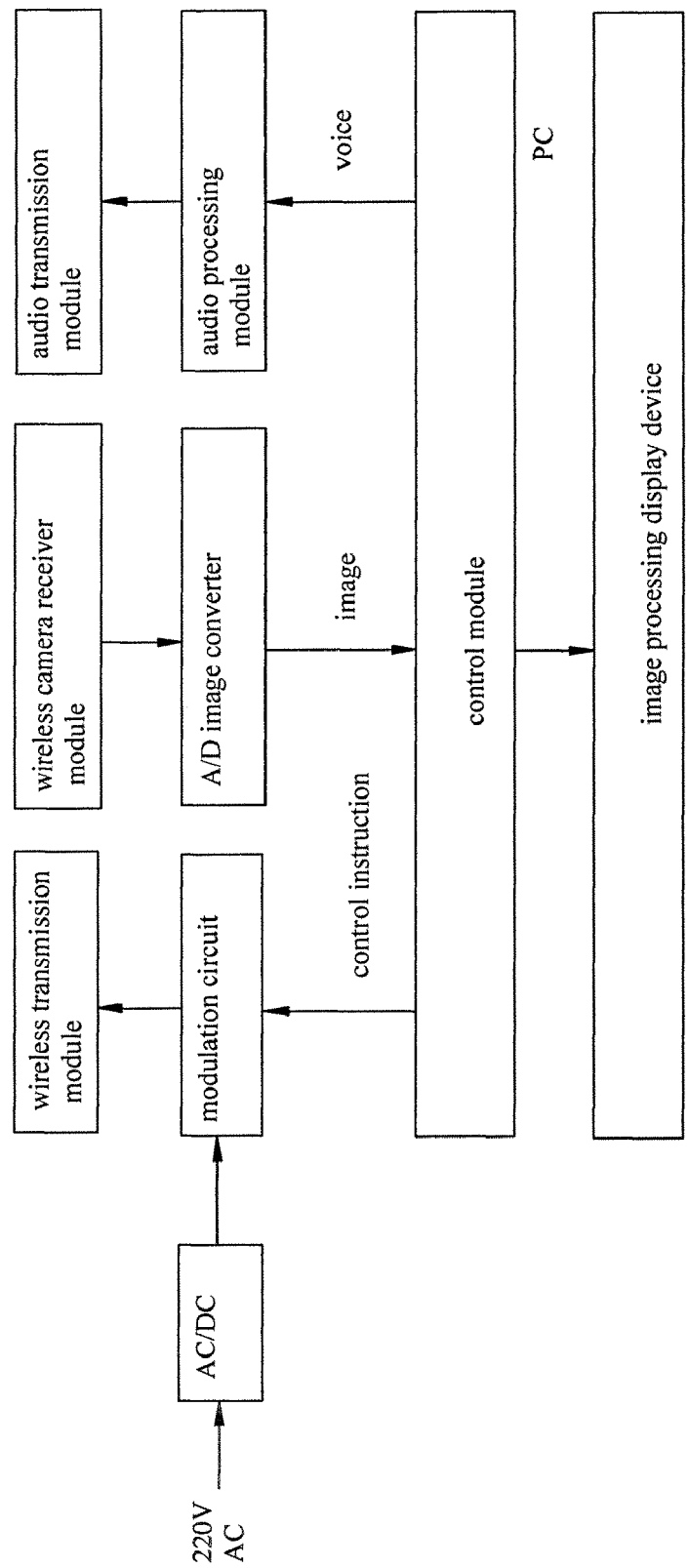
FIG. 2 is a circuit diagram of a control system of the present invention.
Figure 3:
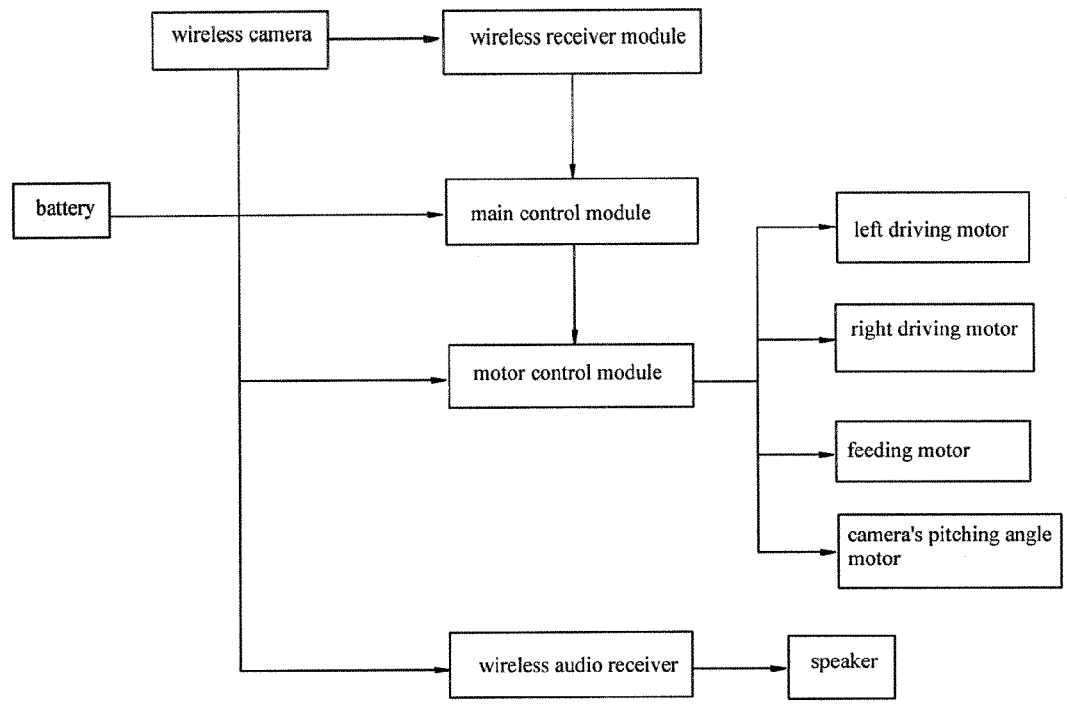
FIG. 3 is a circuit diagram of a robot body of the present invention.
Figure 4:
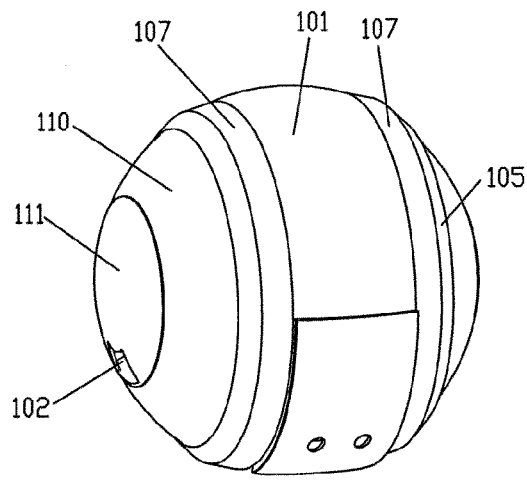
FIG. 4 is a stereogram schematic diagram of a robotic pet-sitter system of the present invention.
Figure 7:
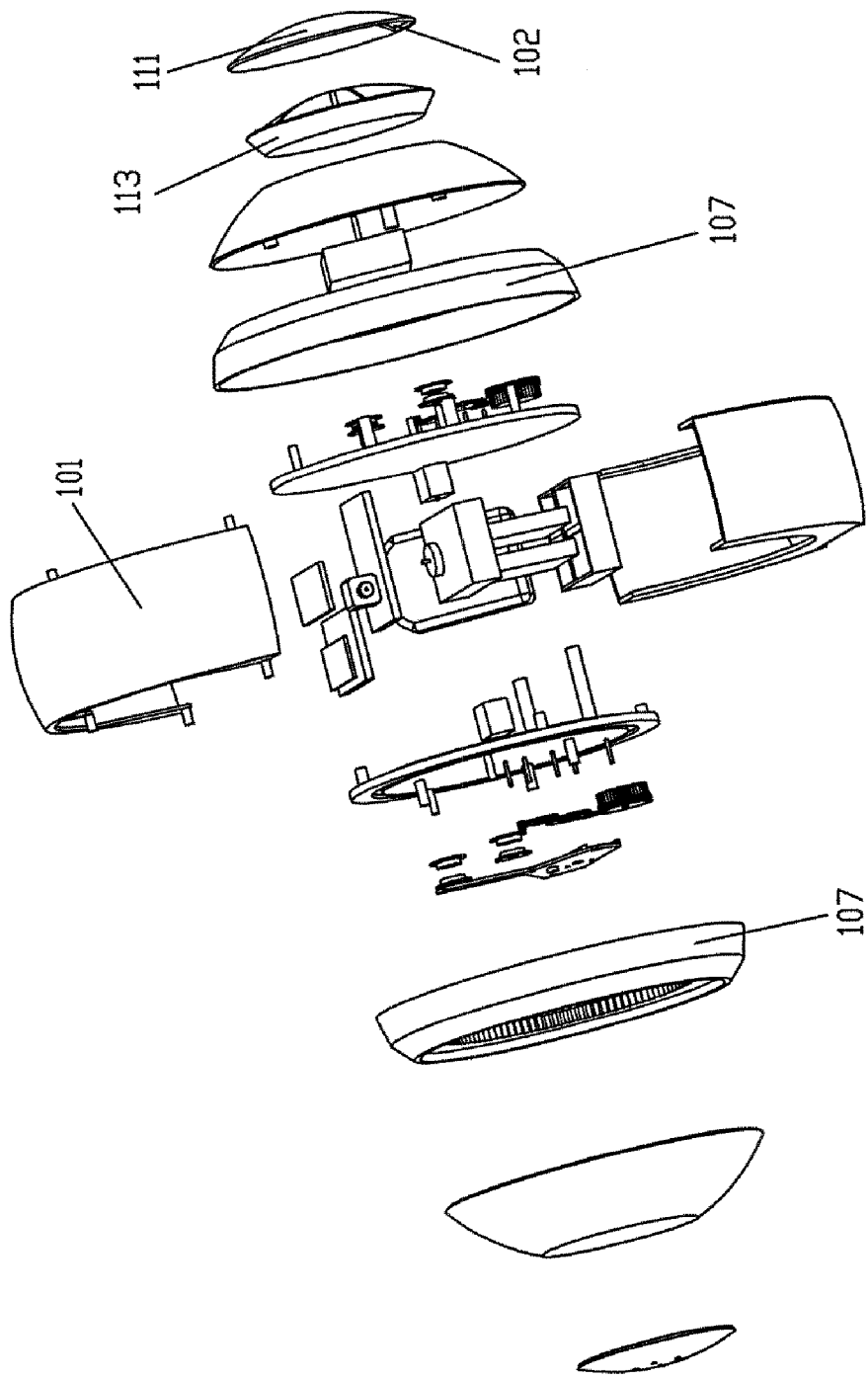
FIG. 7 is a decomposed structure schematic diagram of a robotic pet-sitter system of the present invention.

The control system described in FIG. 2, specifically includes a control module, a signal processing and transmission module composed of a wireless transmission module and modulation circuits, a wireless camera receiver module, an analog/digital image converter (A/D image converter) and an image processing display device, an audio processing module and an audio transmission module connected to the control module, wherein, the function of the control module, the image processing display device and the audio processing module realized by using the local PC. The circuit structure shown in FIG. 3 is defined in the robotic body 10, the circuit includes a main control module and a motor control module controlled by the main control module, the main control module also controls and connects with a long-range wireless communication module, In addition, includes a wireless audio receiver and a speaker, and a camera defined in the robotic body 10, the camera connecting with the long-range wireless communication modules. The local PC receives the instructions of the controller, and transfers the instructions to the modulation circuits through the serial port, the modulation circuits used to amplify and modulate the control instructions sent out by the local PC, and launch out the control instruction signals after modulation through the wireless transmission module, send out the various instructions to the robotic body 10. A long-range wireless communication module in the robotic body 10 exchanges data with the local PC through the agreement of wireless network, receives the command signals from the control system and decodes the command signals by the main control module, processes into the PWM control signals for controlling various motor, then amplified by the motor control module and controls the driving system and the feeding module, makes the mobile robot move according to motion instructions, and open the feeding boxes according to feeding instructions. The camera on the robotic body 10 used to take the image of the pet and it's around, processes image signals into the video signals sent out by the wireless communication module. A wireless camera module and an A/D converter in the control system A/D converts the received video signals and passes to the local PC, then the converted digital video signals are processed and displayed by the local PC. In this way, the pet robot can receive real-time video Images of the pet, as if the telescope of the owner and the owner can also know about what happen at home through this video system. The control system comprises an audio transmission module and a microphone, the pet owners can communicate with pet through the microphone, or play music downloaded from the PC for the pet to listen, the PC outputs the audio signals including voice and music to the audio transmission module through the computer's audio mouth, transfers to the audio receiver of the robotic body, and broadcasted by the speaker, the pet owners communicate with the pet by the voice. The audio signals transmission, the video signals transmission and the command signals transmission between the robotic body and the control system uses relatively independent communication channel, no communication and mutual interference exists among them. Although a wireless communication module in the robotic body is used to achieve the control instruction signals reception and the video signals transmission, however, uses independent communication channels, of course, can use two separate modules to achieve individually the control instruction signals reception and the video signals transmission. The present invention can make the wireless transmission module, the wireless camera receiver module, and the audio transmission module of the control system together forming the RF module 3 in FIG. 1, and the video capture box 4 in FIG. 1 is composed of the A/D image converter, used to convert analog video signals into digital video signals. The Local PC can be replaced by the same or similar function systems.

To make the pet robot play the role on caring for the pets when the pet owners are not at home, the local PC 2 connects to the Internet, communicates with the remote PC 5 through the Internet, the remote PC 5 can transmit the voice and video with the local PC 2, the remote PC can also pass the instructions issued from the pet owners to the local PC, the remote computer controls the robotic body and monitors the pets through the Internet. In this way, although the owners far away from their pet, they can still observe the situation of their pet, play game with them, or feed them.

In order to make the robot move in a relatively narrow space, the robotic body uses the spherical power structure being a spherical shape as a whole. In order to realize motion function, a driving system and a motion structure defined in the robot can make it move, the driving system uses the integration of the driving motor and the motion gear, the motion structure of the robot can be realized in various forms, such as foot type, wheel type, track type, etc.

The preferred embodiment of the robotic body in the present invention as shown in FIGS. 4, 5, 6 and 7, the robotic body comprises a spherical structure body 101, spherical tracks is defined on both sides of the spherical structure body, the driving system and the feeding module is installed inside the spherical structure body, wherein the driving system comprises driving motors and motion gears, the driving motors comprises the first driving motor and the second driving motor, the motion gears is defined inside the track. The first driving motor and the second driving motor defined in the spherical structure body drive their respective motion gear, and respectively connects with the motor control module.

The both sides of the spherical structure body comprise a motion track structure 103, a motion control hemisphere 105 and a pet feeding hemisphere 110. As shown in FIG. 5a, FIG. 5b, FIG. 5c and FIG. 7, motion tracks 107 defined on both sides of the spherical structure body rotate corresponding to the spherical structure body, a track respectively defined in one side, The brink of the track is slightly higher than the spherical structure body, thus the intelligent robot as a whole can realize moving by controlling the rotation of the track. The tracks is defined on both sides of the spherical structure body, so they have two sets of driving structures, to realize different speed and angle of the motors rotating the tracks, to realize turning, moving forward or backward by the control of the main control module and the motor control module.

In the family robotic pet-sitter intelligent device of the present invention, motion gears are defined in each track, that is, a first motion motor 114 and a second motion motor 119 are separately defined in both sides of the motion control hemisphere 105 and the pet feeding hemisphere 110. The motion gears are internal gear that the medial wall has racks. The motion gears transmit with the corresponding outside track respectively through the first track wheel 115 and the second track wheel 120 on them, and the driving motor is corresponding defined in the spherical structure body 101, the second driving motor 121 shown in FIG. 5, but the first driving motor not shown.

The driving motors can transfer driving force to the motion gears through active gears, intermediary transmission gears and a transmission gear. As shown in FIG. 6c, the second driving motor 121 drives the second active gear 124, transmitting to the second intermediary transmission gear 122 through the second active gear 124, then transmitting to the second transmission gear 123 through the second intermediary transmission gear 122, the second transmission gear 123 meshing with the second motion gear 119. As shown in FIG. 6b is the other side of the structure, only to show the first transmission gear 118 in the first group of transmission gears 116, the other gears and driving motors not shown, their structures are same as the second gear transmission structure shown in FIG. 6c, thus no discuss repeatedly.

The purpose of the family robotic pet-sitter intelligent device is to care for pet. A feeding module is defined in one side of the spherical structure body 101, comprising a feeding motor and a feeding box. The feeding box has stored boxes placed with pet food, and a feeding drive structure used to drive the switch of the feeding box to open it. The feeding module has many forms, such as, the stored boxes can be drawer type, under the control of the feeding instructions, the feeding drive structure opens the drawer placed with pet food, or the stored boxes can be control gate type, the feeding drive structure bounces up the control gate, exposing the stored boxes placed with pet food.

Therefore, as shown in FIGS. 5 and 6, the sides of the spherical structure body 101 can be defined with food stored lattice plates 109, the food stored lattice plates 109 can be defined in the food stored plate having a number of the food stored lattices, and a cover plate 111 is defined in the food stored lattice plates 109. The cover plate 111 is fastened connection with the spherical structure body, and a feeding export 102 is defined. The food stored lattice plates 109 can be rotating by the driving of the feeding motor 104 defined in the spherical structure body. For example, defining the food stored plate has six stored lattices 113, through the control of the commands, rotating the food stored lattice plates 109 wherein one food stored lattice corresponding to the feeding export 102, the pet food in the corresponding stored lattice opened.

The spherical structure body 101 of the present invention is connected with the motion track mechanism through the pivot; therefore, a matching block 117 is defined in the spherical structure body. As shown in FIG. 6b, the matching block is fixed with the spherical structure body 101. When the motion track mechanism controls the track rotating relative to the spherical structure body 101, the matching block can ensure the spherical structure body having single stable characteristics as tumbler. In any overturned state it can be automatically restored to the single stable status, and thus make the rotation of the motion track mechanism have driving force.

In order to obtain image signals and to receive control instruction signals, a long-distance wireless communication module 106 and a cameras 108 are defined in the spherical structure body 101, and in order to make the pet owners multi-directionally observe the situation of the pet, the pitch angle of the camera 108 can be adjusted, the robotic body also has a camera-driven motor, The camera-driven motor is connected with the motor control module, thus can adjust the pitch angle of the camera according to the camera-driven instructions of the control instructions.

To use the robotic pet-sitter intelligent system of the present invention has the following features:

1) Remote control: Although the pet owner is far away from his pet, he can still interact with his pet through the Internet to control remotely the pet-sitter intelligent robot.

2) Mobile robot: Different from other similar pet keeping robots, the family pet-sitter intelligent robot can "active" play games with the pet through their own motion.

3) Stable shape: The designed shape makes the family pet-sitter intelligent robot can withstand the impact of pet and not turn over.

4) Real-time monitoring: The family pet-sitter intelligent robot can receive the real-time video images of pet, like the telescope of the pet owners.

5) Feeding pet: When the pet is hungry, the family pet-sitter intelligent robot can dump out the stored food, making the pet free from hunger.

6) Pet entertainment: Although the pet may be alone at home, but it will not be lonely any longer with the family pet-sitter intelligent robot, because the pet robot can play with it, play music for it, and even play the cat sound let it chase.

To sum up, when pet keeping become a trend in an increasingly globalized world, the present invention of the family robotic pet-sitter intelligent system can help to build more harmonious world between people and their pets.

While the preferred embodiment of the present invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A robotic pet-sitter system, comprising a control system and a robotic body, the control system used to wirelessly launch control instruction signals; the robotic body having a wireless receiver module, used to receive control instruction signals and to process the control instruction signals into control signals, a driving system and a feeding module, the driving system configured to move the entire robotic body according to action instructions of the control signals thereby allowing the robotic body to freely traverse a distance or area, the feeding module used to open the feeding box placed with pet food according to feeding instructions of the control signals, wherein the control system comprises a control module used to send out control instructions, a signal processing and transmission module, the signal processing and transmission module used to enlarge and modulate control instructions sent out by the control module, and wireless launch control instruction signals after modulation; the wireless receiver module comprises a wireless communication module, a main control module and a motor control module, the main control module connecting with the wireless communication modules, used to decode the control instruction signals received by the wireless communication module into the control signals, the motor control module used to amplify the control signals and to control the driving system and the feeding module.

2. The robotic pet-sitter system of the claim 1, wherein the control system further comprises an audio processing module and an audio transmission module connecting with the control module, and the robotic body further comprises a wireless audio receiver and a speaker for audio signals transmission and broadcasting.

3. The robotic pet-sitter system of the claim 2, wherein the signal processing and transmission module comprises a radio module, a modulation circuit connecting with the control system, the modulation circuit used to amplify and modulate the control instructions, the wireless transmission module used to launch control instruction signals after modulation.

4. The robotic pet-sitter system of the claim 1, wherein the robotic body further comprises a camera, the camera connecting with the wireless communication module, used to process the obtained image into video signals, and launch out through the wireless communication module; the control system further comprises a wireless camera receiver module to receive the video signals, an A/D image converter connecting with the wireless camera receiver module, and an image processing display device connecting with the control module, the ND image converter used to A/D convert the received video signals, then to process and to display the converted digital video signals by the image processing display device.

5. The robotic pet-sitter system of the claim 4, wherein the control system further comprises an audio processing module and an audio transmission module connecting with the control module, and the robotic body further comprises a wireless audio receiver and a speaker for audio signals transmission and broadcasting.

6. The robotic pet-sitter system of the claim 5, wherein the control module, the image processing display device and the audio processing module are realized by using a local PC.

7. The robotic pet-sitter system of the claim 6, wherein the local PC communicates with a remote PC through Internet, and the remote PC long-distance controls the robotic body and monitors pet through Internet.

8. The robotic pet-sitter system of the claim 5, wherein the signal processing and transmission module comprises a radio module, a modulation circuit connecting with the control system, the modulation circuit used to amplify and modulate the control instructions, the wireless transmission module used to launch control instruction signals after modulation.

9. The robotic pet-sitter system of the claim 4, wherein the robotic body further comprises a camera-driven motor, the motor-driven camera connecting with the motor control module, used to adjust the camera's pitching angle according to camera-driven instructions of the control signals.

10. The robotic pet-sitter system of the claim 9, wherein the control system further comprises an audio processing module and an audio transmission module connecting with the control module, and the robotic body further comprises a wireless audio receiver and a speaker for audio signals transmission and broadcasting.

11. The robotic pet-sitter system of the claim 10, wherein the control module, the image processing display device and the audio processing module are realized by using a local PC.

12. The robotic pet-sitter system of the claim 11, wherein the local PC communicates with a remote PC through Internet, and the remote PC long-distance controls the robotic body and monitors pet through Internet.

13. The robotic pet-sitter system of the claim 10, wherein the signal processing and transmission module comprises a radio module, a modulation circuit connecting with the control system, the modulation circuit used to amplify and modulate the control instructions, the wireless transmission module used to launch control instruction signals after modulation.

14. A robotic pet-sitter system, comprising a control system and a robotic body, the control system used to wirelessly launch control instruction signals; the robotic body having a wireless receiver module, used to receive control instruction signals and to process the control instruction signals into control signals, a driving system and a feeding module, the driving system used to drive the robotic body moving according to action instructions of the control signals, the feeding module used to open the feeding box placed with pet food according to feeding instructions of the control signals wherein the robotic body is a spherical structure body, tracks being defined in its both sides, the driving system and the feeding module being installed in the spherical structure body.

15. The robotic pet-sitter system of the claim 14, wherein the driving system comprises at least a drive motor and a motion gear, the motion gear being defined inside the track, driving the motion gear by the drive motor defined in the spherical structure body.

16. The robotic pet-sitter system of the claim 14, wherein the feeding module comprises a feeding motor and a feeding box, the feeding motor is connected with the motor control module, used to drive the switch of the feeding box; the feeding box is defined under a cover plate fixed in the side of a spherical structure body, being several feeding lattices for placing with pet food, a feeding mouth being defined in the bottom of the cover plate, and the feeding motor driving the feeding box rotating, used to select the feeding lattices corresponding to the feeding mouth.

17. The robotic pet-sitter system of the claim 16, wherein a counterweight is defined in the spherical structure body, the counterweight is fixed connection with the spherical structure body, used to maintain the vertical position that the spherical structure body on the track.

* * * * *